United States Patent Office 3,045,018
Patented July 17, 1962

3,045,018
PROCESS FOR THE RECOVERY OF
TRIETHYLENEDIAMINE
Rocco L. Mascioli, Media, Pa., assignor to Air Products
and Chemicals, Inc., a corporation of Delaware
No Drawing. Filed Dec. 8, 1959, Ser. No. 858,053
2 Claims. (Cl. 260—268)

This invention relates to the separation and recovery of useful fractions from mixtures containing nitrogenous materials.

Recently many tons of polyurethane foam have been produced from formulations containing catalytic amounts of 1,4-diazabicyclo-(2.2.2)-octane. This compounds is most conveniently designated as triethylenediamine because it has the formula

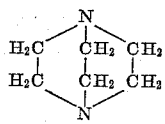

A method for the preparation of triethylenediamine is set forth in the application of E. C. Herrick, Serial No. 628,723, filed December 17, 1956, now Patent 2,937,176 of May 17, 1960. Procedures effective in the recovery of triethylenediamine are described in the application of A. Farkas, Serial No. 772,306, filed November 6, 1958, now Patent 2,950,282.

The present invention is not concerned with the step of converting a reactant gas stream at an elevated temperature to a mixture comprising triethylenediamine, but only with the recovery of useful products from the effluent from a general type of reaction. In describing such general type of reaction broadly enough to embrace improvements which presently have not been conceived, it should be understood that not all the possibilities within such description would be operable, and that such description merely clarifies the general classification of the reaction. Triethylenediamine containing mixtures can be prepared by subjecting appropriate mixtures of reactants in the vapor phase at elevated temperatures such as within the range from 600° F. to 1000° F. to solid acidic catalysts. Sometimes ammonia is included in the reaction mixture but in all cases the principal organic components are compounds in which the ethylene group (—$CH_2CH_2$—) has a nitrogen at one end and either a nitrogen or an oxygen at the other end. Representative members of such compounds include ethylenediamine, diethylenetriamine, triethylenetetramine, tetraethylenepentamine, monoethanolamine, and N-betahydroxyethyl piperazine. In preferred embodiments of the invention, the initial raw material (which may be mixed with recycle material) is a polyethylenepolyamine, preferably diethylenetriamine.

Not only the organic reactants which are the feedstock for the synthesis of triethylenediamine over a solid acidic catalyst but also the effluent from the synthesis zone contains significant amounts of compounds in which the ethylene group (—$CH_2CH_2$—) has a nitrogen at one end and either a nitrogen or an oxygen at the other end. Moreover, such effluent contains at least minor amounts of the compounds present in the feedstock. Representative members of the compounds which might be formed as conversion products from the catalytic cracking zone include: ethylenediamine; diethylenetriamine; triethylenediamine; piperazine; diethanolpiperazine; di(betaaminoethyl) piperazine; and triethylenetetramine. The thermal decomposition products from such compounds are also present in the effluent from the catalytic cracking zone. Representative members of such thermal decomposition products include pyrazine and lower alkyl pyrazines of the formula $C_4R_nH_{4-n}N_2$ in which R is selected from the group consisting of methyl and ethyl groups. The organic effluent from the zone for the synthesis of triethylenediamine over a solid cracking catalyst consists almost entirely of a mixture of the thermal decomposition products derived from and the compounds in which the ethylene group has a nitrogen at one end and either a nitrogen or an oxygen at the other end. Substantially all of the organic components (cyclic, polycyclic, linear or complex) of said effluent can be conveniently classified as members of the class $R_2NCR_nCR_nQR_n$ in which Q is selected from the group consisting of nitrogen and oxygen and in which $n$ is 1 or 2 and in which the R's are the same or different and represent hydrogen or an organo group. Most of the organo groups either have not more than 2 carbon atoms or are portions of cyclic or linear groups in which nitrogen atoms are so positioned that the carbon chains contain not more than 2 atoms. Exact analysis of the composition is not necessary by reason of the desire to recover less than half of it and by reason of the knowledge of the general types of structures present in the complex.

In accordance with the present invention a nitrogenous mixture of organic compounds flowing from a zone for the synthesis of 1,4-diazabicyclo-(2.2.2)-octane within the range from 600° F. to 1000° F. over a solid acidic cracking catalyst which mixture consists essentially of compounds having the formula $R_2NCR_nCR_nQR_n$ in which Q is selected from the group consisting of nitrogen and oxygen and in which $n$ is an integer not greater than 2 and in which the R's are the same or different and in which each R is selected from the class consisting of hydrogen, organo groups, and portions of cyclic groups, is processed to obtain a primary recovery of 1,4-diazabicyclo-(2.2.2)-octane and to prepare a quasi-waste mixture, and the quasi-waste mixture is treated with a mixture of a minor amount of water and a major amount of formaldehyde to convert at least a portion of the primary amines and secondary amines in said quasi-waste mixture to materials boiling higher than 1,4-diazabicyclo-(2.2.2)-octane and to bring about the formation and precipitation of a hydrate of 1,4-diazabicyclo-(2.2.2)-octane from the reaction product and to provide a liquid from which fractions rich in alkylpyrazines may be distilled.

The nature of the present invention can be further clarified by reference to a plurality of examples.

EXAMPLE I

A catalytic reactor was filled with granular sized particles (i.e. each particle having minimum dimensions within the range from about 1 to about 15 mm.) of acidic cracking catalyst having a Cat-A activity of 34 and consisting of a synthetic dehydrated silica-alumina gel comprising about 7 parts of silica per part of alumina. The fixed bed of catalyst was heated to 675° F. and maintained at 675° F. while a stream of vapors of preheated diethylenetriamine passed through the bed for catalytic conversion therein at a rate of about 1.2 liquid volumes of diethylenetriamine per volume of catalyst per hour at about atmospheric pressure. The effluent from the catalyst chamber was cooled and the normally gaseous products separated from the residue, which was fractionally distilled. A fraction boiling 330-370° F. comprising crude triethylenediamine was cooled, thereby precipitating crystals of triethylenediamine and leaving a mother liquor.

In alternative methods, technical grades of triethylenediamine crystals are precipitated by cooling mixtures of a straight chain hydrocarbon (e.g. normal pentane) and crude triethylenediamine. Such hydrocarbon solvents more readily dissolve the miscellaneous impurities than the desired triethylenediamine, and may also be employed in washing impurities from the cooled crystals. The recovery of a concentrated mother liquor from the mixture is readily accomplished by stripping the low boiling solvent from the mixture. Instead of using pentane, solvents such as acetone, methyl ethyl ketone, ethyl ether and/or mixtures thereof may be employed.

The above description of the preparation of triethylenediamine by subjecting diethylenetriamine to a solid acidic catalyst is merely background description, inasmuch as the present invention is concerned with processing the by-products and waste products from the synthesis of triethylenediamine by any high temperature catalytic procedure.

Particular attention is directed to the steps of recovering valuable products such as triethylenediamine and alkylpyrazines from quasi-waste mixtures. The mother liquors and grandmother liquors from the crystallization steps and the fractions boiling above or below the portion subjected to crystallization and/or other materials derived from the effluent from the triethylenediamine synthesis zone may be mixed or each separate fraction may be processed as a quasi-waste mixture. Of course, it is generally most economical to separate a primary portion of the triethylenediamine from the effluent from the synthesis zone before initiating the relatively expensive procedure of the present invention which is especially effective in recovering valuable components from quasi-waste materials. To 100 grams of the quasi-waste mixture, 10 grams of paraformaldehyde were added slowly during a period of about 10 minutes. The temperature of the reaction mixture rose to about 130° F. during the addition and rose to 184° F. after 28 minutes. The formaldehyde reacted with some of the primary amines and secondary amines in the reaction mixture, forming condensation products which were less volatile than such reactive amines. Water was also a reaction product and this water plus some of the water present in the formaldehyde combined with the triethylenediamine to form triethylenediamine hydrate, which was insoluble in the reaction mixture and precipitated from the cooled mixture. The reaction mixture was allowed to cool and was filtered at 80° F. The filter cake was washed with several portions of normal pentane. The washed filter cake consisted predominanently of a hydrate of triethylenediamine. Of particular importance, the quantity of triethylene diamine hydrate obtained by the use of formaldehyde is significantly greater than when the triethylenediamine hydrate is prepicitated from the quasi-waste mixture by addition of water. Apparently some of the primary and secondary amines in the quasi-waste mixture enhance the solubility of the hydrate of triethylenediamine and the formaldehyde reacts with such amines to produce products which in the presence of the other components dissolve less of the hydrate of trialkylenediamine, thereby bringing about the precipitation of a larger proportion of the hydrate. After the aldehyde has reacted with the more reactive primary and secondary amines, the triethylenediamine hydrate crystals are more completely precipitated from the relatively large volume of treated liquid. The triethylene diamine may be recovered from its hydrate by any appropriate procedure, such as by distillation of a xylene solution of the hydrate, whereby the water is azeotropically distilled. In the fractional distillation of the effluent from the catalyst chamber, it is sometimes advantageous to add a considerable volume of xylene to remove more of the impurities in the cut of about 180–330° F. The hydrate of triethylenediamine from one run can ordinarily be decomposed by admixture with the xylene solution of a subsequent run and azeotropic xylene distillation.

The washings from the filter cake and the filtrate were distilled through a fractional distillation column to provide a mixture of alkyl pyrazines. Such recovery of alkyl pyrazines constitutes an important advantage of preferred embodiments of the recovery method of the present invention. Previously it had not been feasible to isolate alkyl pyrazines from the effluent from a catalytic zone for the manufacture of triethylenediamine, notwithstanding the knowledge from infrared analyses, etc. that the valuable alkyl pyrazines were present in such effluent. A variety of primary and secondary amines having boiling points near the alkyl pyrazines had previously interfered with attempts to isolate alkyl pyrazines by fractional distillation. However, the step of treating the quasi-waste mixtures with formaldehyde converts at least a portion of such troublesome primary and secondary amines to higher boiling components, whereby it is feasible to recover alkyl pyrazines by fractional distillation at temperatures within the 280–380° F. range.

EXAMPLE II

A quasi-waste mixture (derived by procedures such as described in Example I) was analyzed using procedures involving the mass spectograph and was found to contain 19% by weight of triethylenediamine and 27 weight percent pyrazines. To 367 grams of such quasi-waste mixture, 30 grams of paraformaldehyde (90% formaldehyde and 10% water) were added. A peak temperature of 158° F. was observed. After the reaction mixture had cooled, to about 70° F., a precipitate was noted and the precipitate was removed by filtration, washed with pentane, and found to be essentially a hydrate of triethylenediamine. Azeotropic distillation of water and xylene permitted the isolation of 54.5 g. of triethylenediamine from 64 g. of the hydrate. A series of tests indicated that the hydrate was approximately a monohydrate. Thus 54.5 g. of triethylenediamine, or 78% of the 70 g. present in the quasi-waste mixture, was recovered. The filtrate was fractionally distilled at 100 mm. mercury pressure and 80 grams of alkyl pyrazines were thus recovered as a 212–230° F. fraction.

The previous examples are merely illustrative of preferred embodiments of the invention, which can also be described in more generic terms. Triethylenediamine was prepared by treatment of a mixture of ammonia and an organic compound over an acidic solid catalyst, and the normally liquid effluent was treated in a primary effort to isolate a portion of the triethylenediamine, and those portions of the effluent remaining after such primary effort but possibly containing significant amounts of triethylenediamine were combined to provide a quasi-waste mixture. All such quasi-waste mixtures are residues remaining after one or more treatment steps intended to remove a triethylenediamine rich fraction from at least a part of the effluent from a high temperature (600–1000° F.) triethylenediamine synthesis zone containing a solid acidic catalyst. The quasi-waste mixture consists essentially of compounds having the formula $R_2NCR_nCR_nQR_n$ in which Q is selected from the group consisting of nitrogen and oxygen, and in which the compound may be linear, branched and/or cyclic, and in which $n$ is an integer not greater than 2, and in which the R's are the same or different and in which each R is selected from the group consisting of hydrogen and organo groups and portions of cyclic and linear groups having carbon chains of not more than 2 carbon atoms.

By a series of tests, it is established that the quasi-waste mixtures employed as starting materials for the recovery process of the present invention always contain at least 2% but less than 40% triethylenediamine, and at least 2% but less than 40% alkyl pyrazines having the formula $C_4R_nH_{4-n}N_2$ in which each R is selected from the group consisting of ethyl and methyl. By a series of tests, it is established that the quantity of formaldehyde to be added to the quasi-waste mixture must be at least 4% but less than 40% of the weight of such quasi-waste mixture. Some water, always only a small fraction such as 10% of the weight of the formaldehyde, is always added either simultaneously with the formaldehyde or as a process step not remote from such step of formaldehyde addition. The reaction between the formaldehyde and the basic compounds in the quasi-waste mixture generally heats the mixture to a temperature above 130° F., but if the exothermic reaction does not provide this temperature, the reaction mixture should be heated to at least 130° F. to assure the extent of reaction between formaldehyde and reactable amines attainable at 130° F.

By a series of tests, it is established that acetaldehyde, glyoxal, and/or glycollic aldehyde may be substituted for formaldehyde on a mol for mol basis without impairing the recovery of useful materials, but that only aldehydes having not more than 2 carbon atoms are suitable.

EXAMPLE III

About 300 ml. of ethyl ether was employed as a refluxing solvent during the addition of 10.5 g. of paraformaldehyde to 107 g. of a quasi-waste mixture resulting from a high temperature catalytic synthesis of triethylendiamine. By mass spectrographic analysis, it was known that the quasi-waste mixture contained about 19% or about 20.3 g. of triethylenediamine. By filtration of the cooled reaction mixture, there was recovered about 18.2 g. of a hydrate of triethylenediamine, containing about 15.3 g. of triethylenediamine representing 76.4% of the triethylenediamine content of the quasi-waste mixture. Approximately 18.7 g. of alkyl pyrazines, constituting 64.5% of those present in the quasi-waste mixture, were recovered in a 307–329° F. cut in the fractional distillation at atmospheric pressure.

EXAMPLE IV

Triethylenediamine was prepared by catalytic conversion of a mixture of ammonia and organic compounds having carbon chains of only two carbon atoms. Most of the triethylenediamine was recovered by a preliminary crystallization but a mother liquor was separated. This mother liquor or quasi-waste mixture was weighed as 4,289 grams, and was treated with about 11% by weight (471 g.) of a technical grade of paraformaldehyde containing about 10% water. The temperature rose to 190° F. in about 20 minutes. After the reaction mixture had cooled overnight to 77° F., it was filtered to isolate a fraction rich in a hydrate of triethylenediamine, which was washed by decantation with several portions of normal pentane. About 1,976 g. of the filtrate were fractionally distilled in a 20 plate column at 10/1 reflux ratio to provide 10 fractions, some of said fractions being rich in specific alkyl pyrazines of the general formula $R_4C_4N_2$, in which R is selected from the group consisting of hydrogen, methyl and ethyl, as indicated in the following table:

pentane solutions, which were then redistilled to provide technical grades of: ethyl pyrazine; di-ethyl pyrazines; methyl-ethyl pyrazines; methyl pyrazine; and diethyl-methylpyrazine. Each of these pyrazines is useful as a solvent of the alkylated aromatic amine class to which picoline belongs, and has the superiority attributable to the presence of two aromatic amino groups per nucleus plus the superiority attributable to a high boiling point.

EXAMPLE V

The viscosity of a sample of quasi-waste mixture designated as a grandmother liquor was reduced by admixture of 1004 g. of grandmother liquor with 250 g. of normal pentane. To this mixture 110.4 g. of paraformaldehyde (consisting essentially of 90% formaldehyde and 10% water) was added slowly, thereby initiating an exothermic reaction increasing the temperature of the reaction mixture to about 140° F. and volatilizing a portion of the pentane. The reaction mixture was cooled to 72° F. and filtered. There was recovered 212 g. of a hydrate of triethylenediamine, from which 141 g. of a technical grade of triethylenediamine was recovered. This recovery of 141 g. of triethylenediamine represented a 75% recovery of the approximately 19% of triethylenediamine present in the grandmother liquor.

In a series of tests, the ratio of paraformaldehyde to grandmother liquor was varied to determine the optimum ratio of paraformaldehyde to grandmother liquor. Good results were obtained when the paraformaldehyde represented from about 8% to about 20% of the quasi-waste mixture. Data relating to this series of tests are shown in the following table:

*Table II*

| Wt. para-formalde-hyde GML | Reaction Temp., °C. | Filtration temp., °C. | Percent triethylenediamine in hydrate | Triethylenediamine recovery |
|---|---|---|---|---|
| .09 | 81 | 27 | 84 | 65 |
| .17 | 82 | 8 | 72 | 62 |
| .11 | 91 | 8 | 81 | 71 |
| .11 | 59 | 22 | 67 | 75 |
| .10 | 85 | 27 | 78 | 64 |

The data of the above table indicate that the weight ratio of paraformaldehyde to the grandmother liquor can be varied throughout a range such as from about 8% to about 20% of the weight of the quasi-waste mixture.

*Table I*

ANALYSIS OF THE VARIOUS FRACTIONS OF THE QUASI-WASTE MIXTURES AFTER FORMALDEHYDE TREATMENT

| Boiling Range, °F | 284–302 | 302–311 | 311–320 | 320–329 | 329–338 | 338–345 | 345–347 | 347–356 | 356–358 |
|---|---|---|---|---|---|---|---|---|---|
| Wt. (gms.) | 231 | 126 | 137 | 108 | 270 | 397 | 80 | 258 | 244 |
| Composition percent by wt. alkyl pyrazines, classified by substituents: | | | | | | | | | |
| Monoethyl | 28.2 | 56.9 | 56.6 | 45.7 | 21.0 | 1.8 | | | 0.4 |
| Diethyl | | 0.1 | 0.2 | 0.5 | 1.2 | 3.4 | 6.8 | 13.2 | 22.0 |
| Methylethyl | 1.6 | 4.7 | 11.9 | 21.5 | 35.2 | 48.7 | 41.9 | 25.2 | 1.2 |
| Monomethyl | 1.2 | 0.1 | | | | 0.7 | | | |
| Diethylmethyl | | | | | | 0.1 | 0.1 | 0.2 | 0.5 |
| Total alkyl pyrazines | 31.0 | 61.8 | 68.7 | 67.7 | 57.4 | 54.7 | 48.8 | 38.6 | 23.6 |
| Wt. of alkyl pyrazines | 71.6 | 78.0 | 94.2 | 73.2 | 155.0 | 217.0 | 39.0 | 100 | 57.5 |
| Triethylenediamine | 0.3 | 0.6 | 2.6 | 5.2 | 9.9 | 14.7 | 16.8 | 13.5 | 2.4 |
| Piperazines | 4.3 | 8.0 | 17.2 | 22.4 | 28.8 | 28.4 | 24.7 | 26.1 | 56.7 |
| Water | 1.2 | 0.1 | 0.5 | 0.4 | 0.3 | 0.2 | 0.7 | 0.4 | 0.7 |
| Xylenes | 59.6 | 29.3 | 7.0 | 3.7 | 2.4 | | | | |

The total recovery of about 462 g. of alkyl pyrazine, as indicated in Table I, constituted about 10.8% of the quasi-waste mixture. Each fraction was diluted with five volumes of pentane. Using dilute hydrochloric acid having a pH of 5, the relatively strong bases (triethylenediamine and piperazine) were solvent extracted from the

EXAMPLE VI

A sample of 1255 g. of quasi-waste mixture designated as a mother liquor was treated by adding 126 g. of paraformaldehyde in small increments while keeping the temperature of the reaction mixture below about 185° F. The reaction mixture was then cooled to 81° F. and filtered to recover 286 g. of a hydrate of triethylenediamine. The thus recovered filtrate was purified to isolate 223 g. of triethylenediamine, indicating that the hydrate contained about 78% triethylenediamine. An analysis of the initial mother liquor indicated the presence of about 28% triethylenediamine, thus indicating that about 64% of the triethylenediamine content was recovered as the hydrate by the use of formaldehyde as a selective reagent for precipitating the triethylenediamine hydrate.

Obviously many modifications and variations of the invention as hereinbefore set forth may be made without departing from the spirit and scope thereof, and therefore only such limitations should be imposed as are indicated in the appended claims.

What is claimed is:

1. In the recovery of useful products from a nitrogenous mixture consisting essentially of compounds resulting from a synthesis of triethylenediamine at an elevated temperature, said mixture containing at least 2 but not more than 40% 1,4-diazabicyclo-(2.2.2)-octane, at least 2% but not more than 40% alkyl pyrazine of the formula $C_4R_nH_{(4-n)}N_2$ in which each R is selected from the group consisting of methyl and ethyl, the method which consists essentially of the steps of:

(a) adding at least 8% but less than 20% by weight of formaldehyde to said mixture together with an amount of water constituting a small fraction of the aldehyde;

(b) heating the mixture of formaldehyde, water and nitrogenous mixture to a temperature of at least 54° C. to convert substantially all primary amines and secondary amines to high boiling condensation products and to bring about the formation of a hydrate of 1,4-diazabicyclo-(2.2.2)-octane;

(c) cooling the reaction product to precipitate the hydrate of 1,4-diazabicyclo-(2.2.2)-octane;

(d) and separating a solid hydrate of 1,4-diazabicyclo-(2.2.2)-octane from the reaction product.

2. The method of claim 1 in which the liquid remaining after such separation of the solid hydrate of diazabicyclo-octane is fractionally distilled to recover technical grades of alkyl pyrazines of the formula $C_4R_nH_{(4-n)}N_2$ in which each R is selected from the group consisting of methyl and ethyl.

References Cited in the file of this patent
UNITED STATES PATENTS 2,639,284    Warren _____ May 19, 1953

OTHER REFERENCES

Whitmore: Organic Chemistry, pages 225–227, 2nd Ed. (1951).

Farkas et al.: Industrial and Engineering Chemistry, vol. 51, pages 1299–1300, October 1959.